United States Patent Office

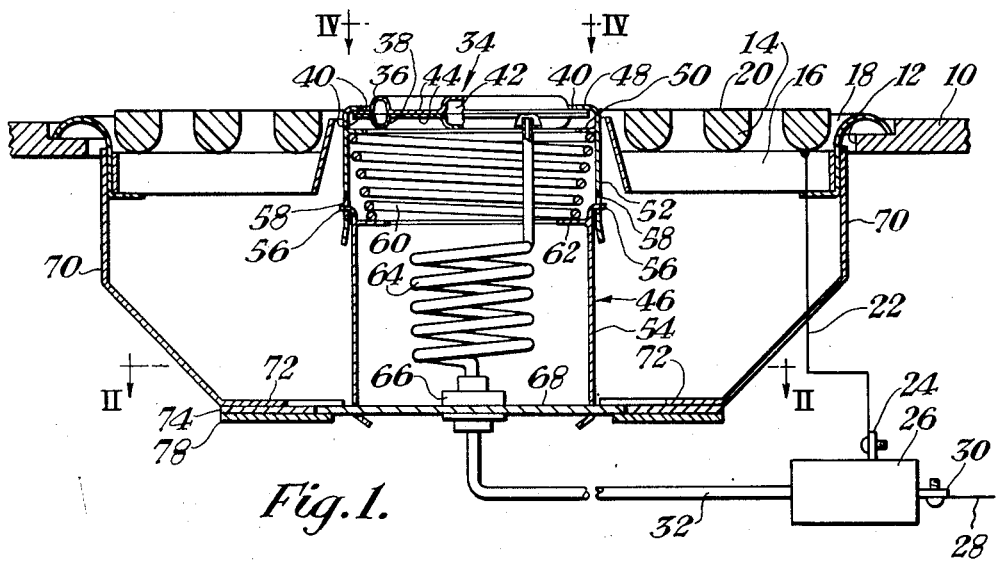

2,786,930
Patented Mar. 26, 1957

2,786,930

THERMOSTATIC CONTROL FOR SURFACE HEATERS

Victor Weber, Greensburg, Hugh J. Tyler, Pittsburgh, and William J. Russell, Jeannette, Pa., assignors to Robertshaw-Fulton Controls Company, Greensburg, Pa., a corporation of Delaware Application September 8, 1954, Serial No. 454,754

13 Claims. (Cl. 219—37)

This invention relates to thermostatic controls and more particularly to controls for surface heaters of cooking ranges.

Thermostatic control of the surface heaters or top elements of cooking ranges has long been considered desirable to protect the contents of the cooking vessels placed thereon. While such controls have been proposed, heretofore, no satisfactory solution of the various difficulties which presented themselves has been offered. In the case of thermostatic controls for ovens or other compartments of ranges where baking and broiling operations are carried on, the degree of oven heat is a satisfactory measure of the condition of the food being cooked. Consequently, the thermally sensitive element need only be subjected to the heat in the oven to provide adequate control of the cooking operation.

In the case of surface heaters, however, other problems are encountered. There is no compartment within which a uniform degree of heat can be maintained and within which the food can be housed. On the contrary, cooking operations which are conducted over the surface heaters usually involve the use of a cooking vessel within which the material can be brought to proper heat. The mere location of the thermal element in the ambient temperature zone of the surface heater would not provide accurate indication of the temperature of the cooking vessel or the condition of the food therein. Practical considerations forbid the placing of the thermal element within the cooking vessel or in contact with the food. Consequently, contact of the thermal element with the cooking vessel must be on the exterior, easily made and broken, and within the zone of greatest heat of the heating elements.

It is, however, apparent that the thermal element should respond to the temperature of the cooking vessel and not to that prevailing at the source of heat, despite their close proximity. Furthermore, the arrangement of the parts should be sufficiently flexible to permit a thermostatic switch or other control to be located at any desired point on the range, either adjacent or remote from the surface heater.

In a preferred embodiment of the invention, the temperature sensing element may comprise a pair of juxtaposed walls connected together at their peripheries to define an enclosed chamber for the reception of a thermal fluid, at least one of the walls being provided with a depressed medial portion extending toward the other wall and being secured thereto for preventing deflection of the walls upon variation of pressure within the chamber. Thus, relatively thin walls which are conducive to rapid heat transfer may be used without danger of the walls flexing to vary the volume of the chamber upon pressure changes therein.

An object of the invention is more accurately to control the temperature of utensils used upon the surface heaters of cooking ranges and the like.

Another object of the invention is to utilize a heat sensitive element which will be highly responsive to temperature changes but durable in construction.

Another object of the invention is to permit installation of the device in confined spaces without affecting its ability to operate satisfactorily.

Another object of the invention is to insure response of the device to the temperature condition of the cooking vessel.

Another object of the invention is to permit location of the control for the heat sensitive device at a point remote from the heating unit.

Another object of the invention is to assure ease of installation and removal of the heat sensitive device by mounting the same in a shield which may be latched beneath a surface heater.

Another object of the invention is to enable a variety of different switches or other controls to be utilized in connection with the surface heater while retaining the advantages of the control.

Another object of the invention is to render the device applicable to existing ranges without material changes in the standard designs.

Other objects and advantages will become apparent from the following specification taken in connection with the accompanying drawings wherein:

Fig. 1 is a somewhat schematic view showing, in section, a surface heater to which one embodiment of the invention is applied;

Fig. 2 is a sectional view taken on the line II—II of Fig. 1;

Fig. 3 is a sectional view taken on the line III—III of Fig. 2;

Fig. 4 is a fragmentary plan view taken on the line IV—IV of Fig. 1 and showing the temperature sensing element of the invention;

Figure 5:
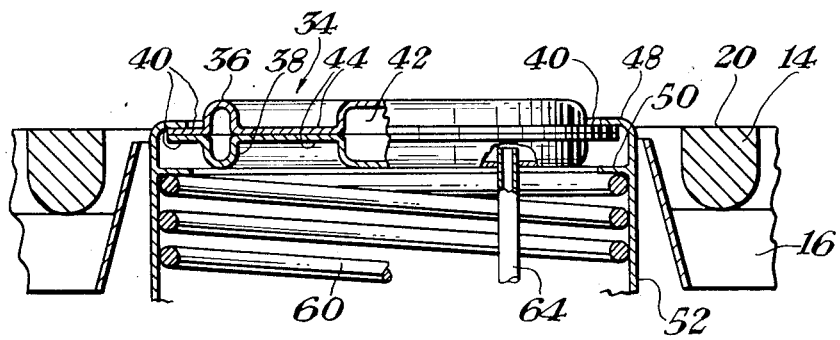
Fig. 5 is a fragmentary sectional view similar to Fig. 1 showing a portion of the apparatus on an enlarged scale.

While the invention is shown and described in connection with the top unit or surface heater construction of an electric range, it should be understood that it is equally applicable for controlling similar heating devices on fluid fuel applicances, such as gas ranges. Moreover, the invention is not limited to such heating devices for appliances of the kind chosen for descriptive purposes herein but may find a wide field of usefulness wherever the control of temperatures is desired.

Referring more particularly to the drawings, there is shown, in Fig. 1, a top plate 10 of an electric range having an aperture 12 formed therein for the reception of an annular heating element 14 of the surface heater. The heating element 14 is supported by a spider 16 secured at its periphery to a flange 18 which rests upon the top plate 10 of the range. The spider 16 is positioned within the aperture 12 to support the annular heating element 14 with its exposed surface 20 substantially flush with the top surface of the top plate 10. The heating element 14 is connected by a wire 22 to a terminal 24 of a thermostatically operated electric switch 26 which receives current from a source of supply by way of a wire 28 connected to a terminal 30 of the control unit 26. As the thermostatically operated electric switch 26 forms no part of the present invention, further description thereof is deemed unnecessary.

This invention is more particularly directed to the provision of means for controlling a temperature of a cooking utensil heated by the heating element 14. To this end, a capillary tube 32, which is connected at one end to a suitable expansible element (not shown) within the thermostatic switch 26, is provided at its opposite end with a hollow temperature sensing element 34.

The temperature sensing element 34 comprises a pair of juxtaposed plates 36, 38 each of which is provided with a peripheral radially extending flange 40. The flanges 40 are connected together to provide a hermetic seal as by soldering, welding or the like to define an enclosed chamber 42 between the plates 36, 38.

The capillary tube 32 extends through the plate 38 to communicate with the chamber 42. The chamber 42 and capillary tube 32 are charged with a suitable thermal fluid which will expand or contract in response to variations in temperatures sensed by the element 34. To assure rapid heat transmission to the thermal fluid within the chamber 42, the plates 36, 38 are formed of relatively thin material. However, material thin enough to assure rapid heat transmission may flex under pressure variations within the chamber 42. Since flexing of the plates 36, 38 would vary the volume of the chamber 42 and prevent accurate transmission of pressure variations to the control switch 26, the plates 36, 38 are secured together at medial points to prevent such flexing. To this end, a plurality (in this instance six) of angularly spaced medial portions 44 of each plate 36, 38 are depressed to lie substantially in the plane of the peripheral flanges 40. The depressed portions 44 of the plate 36 register with and engage the depressed portions 44 of the plate 38. The contacting depressed portions 44 are fusibly united by soldering, spot welding or the like and serve to impart rigidity to the plates 36, 38.

If desired, the depressed medial portions 44 of the plates 36, 38 may take a form other than that shown. For example, the depressed portions may take the form of concentric circles with suitable breaks formed therein for maintaining communication between all parts of the chamber 42.

The temperature sensing element 34 is loosely mounted in one end of a telescopic tubular shield 46. The flanges 40 of the temperature sensing element 34 are positioned between a pair of spaced flanges 48, 50 formed on one end and extending inwardly of a movable portion 52 of the shield 46. The movable portion 52 of the shield 46 is slidably mounted on a fixed portion 54 with slidable movement thereof being limited by a plurality of lugs 56 formed on the portion 54 and extending through suitable apertures 58 formed in the movable portion 52. The telescopic shield 46 is normally biased to its elongated condition by a spring 60 engaging the flange 50 of the movable portion 52 and seated on a flange 62 formed on the fixed portion 54. In its biased position, as best shown in Fig. 5, the movable portion 52 preferably extends slightly above the surface 20 of the heating element 14 for a purpose which will more fully appear hereinafter.

The temperature sensing element 34 is normally biased into engagement with the flange 48 to position the top surface of the plate 36 slightly beyond the open end of the movable portion 52 of the shield 46. To this end, a medial portion 64 of the capillary tube 32 is coiled in the form of a helix and is connected by a suitable fitting 66 to a normally fixed circular plate 68 carried by the shield portion 54. The coiled portion 64 of the capillary tube 32 is positioned within the fixed portion 54 of the shield 46 to be shielded from radiant heat from the heating element 14 and serves as a yieldable support for the temperature sensing element 34.

It will be apparent that when the flange 40 of the temperature sensing element is in engagement with the flange 48, the open end of the shield 46 is effectively sealed so that food, spilled from cooking vessels on adjacent heaters when the heater 20 is not in use, cannot pass into and be trapped within the shield 46. Thus there is no possibility of material subject to spoilage being accumulated in an inaccessible area to create an odious condition.

Furthermore, engagement of the flanges 40, 48 is effective to provide a path along which heat may flow by conduction to assure rapid heating of the thermal fluid within the element 34 in the event the heater 20 is accidently connected to a source of power when no cooking vessel is in engagement with the element 34. This assures rapid cut-off of the heater 20 under such conditions and prevents "runaway" operation thereof.

Figure 6:
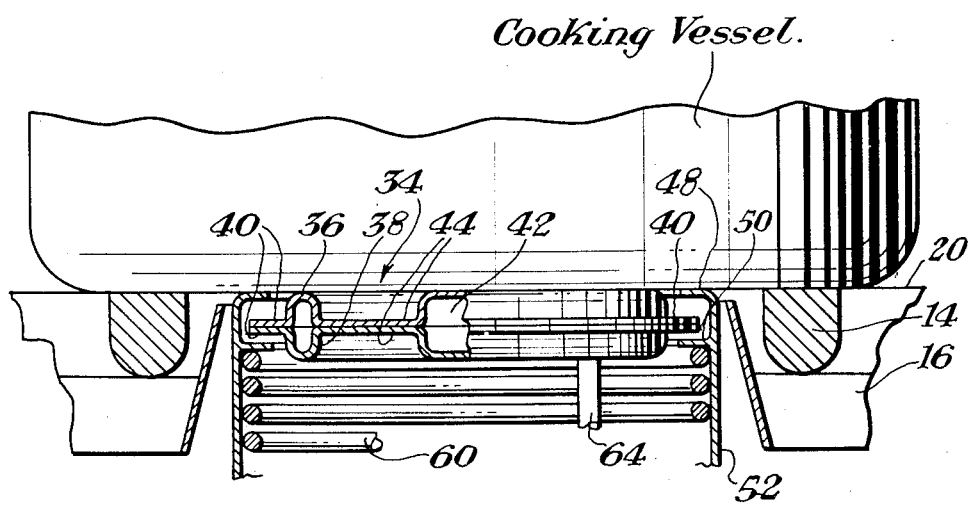
Fig. 6 is a view similar to Fig. 5 but showing the parts of the apparatus in different operating positions.

As best shown in Fig. 6, a cooking vessel, supported by the heater 20, will be in engagement with the temperature sensing element 34 to hold the flange 40 thereof out of engagement with the flange 48 so that flow of heat by conduction along the aforementioned path from the shield 46 to the thermal fluid is prevented. Preferably, the axial distance between the top surface of the plate 36 and the flange 40 is less than the axial distance between the flanges 48, 50 so that the flange 40 will float between the flanges 48, 50 when a cooking vessel engages the element 34 to prevent any flow of heat by conduction to the thermal fluid from the shield 46 and permit the temperature of the fluid to follow substantially only the tempertaure of the cooking vessel.

The flange 50 is effective to prevent excessive axial movement of the temperature sensing element 34 against the bias of the coiled capillary tube 64 to prevent damage to the tube 64 in the event the element 34 is depressed by an unskilled operator.

Means is provided for releasably mounting the plate 68 axially of and beneath the heating element 14 to facilitate cleaning and servicing. This means comprises a pair of straps 70 each of which is secured at one end to the heating element supporting flange 18 and has the other end 72 thereof extending downwardly and inwardly toward the axis of the heating element 14. An annular plate 74 is secured to the end portions 72 of the straps 70 to underlie the same with the end portions 72 extending partially over the open central portion thereof. The annular plate 74 is also provided with a pair of inwardly extending projections 76 offset from the plane of the plate 74 and lying in the plane of the end portions 72 of the straps 70.

Secured to the underside of the plate 74 is a pair of diametrically opposed abutment plates 78 which extend radially inward to partially underlie the open central portion of the annular plate 74.

The circular plate 68 defines a radially extending flange adapted to fit into the annular plate 74 and is provided with diametrically opposed recesses 80 which are of sufficient depth to permit passage of the abutment plates 78 when the plate 68 is inserted into the plate 74. The bottom walls 82 of the recesses 80 preferably take the form of spirals to diverge gradually toward the outer edge of the plate 68. Each wall 82 is engageable with a radially extending cam surface 84 formed on the plate 74 adjacent each abutment plate 78.

It will be apparent from the foregoing, that the assembly of the temperature sensing element 34, shield 46 and plate 68 may be quickly and easily removed from its operating position with respect to the heating element 14 by rotation of the assembly about its axis to bring the relatively deep portions of the recesses 80 into alignment with the abutment plates 78 and then moving the entire assembly downward. Similarly, such assembly may be quickly and easily mounted in its operative position relative to the heating element 14 by inserting the shield 46 through the annular plate 74 with the relatively deep portions of the recesses 80 in alignment with the abutment plates 78. The assembly may then be moved upwardly to place the circular plate 68 in the plane of the annular plate 74 and in engagement with the end portions 72 of the straps 70 and with the projections 76. Rotation of the assembly in a counter-clockwise direction as viewed in Fig. 2 will move portions of the plate 68 over the abutment plates 78 while simultaneously causing a wedging action to take place between the spiral bottom walls 82 of the recesses 80 and the cam surfaces 84.

In the operation of the structure shown, a cooking vessel placed upon the surface 20 of the heating element 14 will first engage the plate 36 of the temperature sensitive element 34 to move the element 34 downward against the bias of the coiled portion 64 of the capillary tube 32. Thereafter, the cooking vessel will engage the upper end of the movable portion 52 of the telescopic shield 46 to move the same downward against the bias of the spring 60 with such movement continuing until the vessel rests firmly on the heating element 14. With this arrangement, good contact of the cooking vessel with the temperature sensing element 34 and the movable portion 52 of the shield 46 is assured.

Current will flow from the power line 28 through the switch 26 to energize the heating element 14 by way of the wire 22 in the usual manner. The cooking vessel which is supported on the surface 20 of the heating unit 14 receives heat therefrom and experiences a rise in temperature which causes a corresponding temperature increase in the plate 36 of the temperature sensing element 34 since the plate 36 is in engagement with the vessel. Heat is conducted through the plate 36 to the thermal fluid within the chamber 42 of the temperature sensing element 34 to cause expansion of the fluid. Variation in the condition of the thermal fluid in the chamber 42 is transmitted by way of the capillary tube 32 to the thermostatic switch 26 to operate the same and thus control the temperature at which the food in the vessel will be cooked.

The temperature sensing element 34 is in juxtaposed relation with the heating element 14 but is shielded from the heat thereof by the movable portion 52 of the shield 46. Thus, the element 34 is responsive primarily to the temperature of the cooking vessel and is only slightly affected by the temperature of the heating element. The large area of surface on the thermal element exposed to the temperature of the vessel as compared with its volumetric capacity provides quick response to the temperature of the cooking vessel. Furthermore, the particular construction of the temperature sensing element 34 assures rapid heat transmission through the thin walls thereof while maintaining accurate transmission of pressure variations therein to the thermostatic control switch 26.

It will be understood that, although a single embodiment has been shown and described, the invention may be variously embodied and changes may be made in the construction and arrangement of parts without departing from the scope of the invention as defined in the appended claims.

We claim:

1. In a heating appliance, an annular surface heater for supporting a vessel to be heated, means for supporting said heater, a plate carried by said supporting means and disposed beneath said heater, a tubular shield having one end disposed within said annular heater, a temperature responsive element in said one end of said shield, and means for releasably securing the other end of said shield to said plate whereby said shield and said temperature responsive element may be detached as a unit from said supporting means.

2. In a heating appliance, an annular surface heater for supporting a vessel to be heated, means for supporting said heater, an annular plate carried by said supporting means and disposed beneath said heater, a tubular shield having one end disposed within said annular heater, a temperature responsive element supported in said one end of said shield, and latching means on said plate engageable with said other end of said shield for releasably securing said shield within said plate.

3. A heating appliance as claimed in claim 2 wherein said latching means includes wedging means for locking said shield relative to said plate upon rotation of said shield.

4. In a heating appliance, an annular surface heater for supporting a vessel to be heated, means for supporting said heater, an annular plate carried by said supporting means and disposed beneath said heater, a tubular shield having one end disposed within said annular heater, a temperature responsive element in said one end of said shield, a flange on said other end of said shield and adapted to fit within said annular plate, abutment means on said plate and adapted to underlie said flange, said flange being notched along a portion of its periphery for the passage of said last named abutment means when said flange is inserted into said annular plate, rotation of said flange after said insertion being effective to move the notched portion thereof out of alignment with said last named abutment means and latch said flange between both said abutment means.

5. A heating appliance as claimed in claim 4 wherein the bottom of the notch in said flange slopes gradually toward the center of said plate to define a wedging surface, and a projection formed on said plate for engagement by said wedging surface upon rotation of said flange to securely lock said flange in said plate.

6. In a heating appliance, an annular heater for heating a vessel, supporting means for said heater, a telescopic tubular shield having a lower portion thereof adapted to be fixed relative to said heater and an upper portion thereof extending through said heater, means for releasably securing said lower portion to said supporting means, means for biasing said shield to extended condition wherein one end of said upper portion projects above the top surface of said heater, a temperature sensing element in said one end of said upper portion, a radially extending flange on said element, a pair of spaced flanges on said shield and disposed on opposite sides of the first said flange, means for biasing said element to a limiting position wherein said first flange and one of said pair of flanges are in engagement to provide a path through which heat may flow by conduction from said shield to said element and to seal the open end of said shield, said element being constructed and arranged to project beyond the end of said upper portion when said element is in said limiting position to be engageable with a cooking vessel and movable thereby to move said flanges out of engagement with each other, the other of said pair of flanges being engageable with said first flange to prevent excessive movement of said element against said bias.

7. In a heating appliance, the combination comprising an annular surface heater for supporting a vessel to be heated, means for supporting said heater, a tubular shield having one end disposed within said heater, a temperature responsive element mounted in said one end of said shield, and means including said supporting means for releasably securing said shield and said temperature sensing element in an operative position with respect to said heater.

8. In a heating appliance, the combination comprising an annular surface heater for supporting the vessel to be heater, means for supporting said heater, a temperature responsive unit including a tubular shield and a temperature sensing element mounted in said shield, means including said supporting means for latching said unit in an operative position within said heater, and manually operable means for releasing said last named means to remove said unit from said heater.

9. In a heating appliance, the combination comprising an annular surface heater for supporting the vessel to be heated, means for supporting said heater, a control unit positioned within said heater including a tubular shield and a temperature responsive element supported in said shield, means including said supporting means for positioning said control unit in an operative position in said heater, and detent means operative upon rotation of said unit in said operative position to latch said unit in said position.

10. In a heating appliance, the combination comprising an annular heater for heating a vessel, a telescopic shield comprising a lower portion and an upper portion extending through said heater, said upper portion being slidably mounted on said lower portion and supported solely thereby, means for biasing said shield toward an extended condition, a sensing element supported in said upper portion for engagement with a vessel placed on said heater, and means for biasing said sensing element toward the upper end of said shield.

11. In a heating appliance, the combination comprising an annular heater for heating a vessel, a cylindrical telescopic shield comprising a lower portion and an upper portion slidably mounted on said lower portion and extending through said heater, means for supporting said lower portion in operative relationship with said heater, a spring mounted in compression between said upper and lower portions interiorly thereof for biasing said shield to extended condition wherein one end of said upper portion projects above the upper surface of said heater, a temperature sensing element in said one end of said upper portion and containing an expansible fluid, abutment means on said one end engageable by said element, a capillary tube extending from said element and having a portion thereof coiled within said lower portion, and means for supporting said capillary portion under compression within said lower portion for biasing said element toward engagement with said abutment means.

12. In a heating appliance, the combination comprising an annular heater for heating a vessel, a cylindrical telescopic shield comprising an upper portion extending through said heater and a lower portion, means for supporting said lower portion in operative relationship with said heater, a spring positioned in said upper portion and in compression between said upper and lower portions for biasing said shield to extended condition wherein one end of said upper portion projects above the upper surface of said heater, a temperature sensing element in said one end of said upper portion and containing an expansible fluid, abutment means on said end engage-able by said element, a capillary tube extending from said member and having a portion thereof coiled within said lower portion of said shield, and means for supporting said capillary portion under compression between said supporting means and said element for biasing said element toward engagement with said abutment means.

13. In a heating appliance, the combination comprising an annular heater for heating a vessel, a telescopic shield comprising an upper cylindrical portion extending through said heater and a lower cylindrical portion, said upper portion being slidably mounted on said lower portion and supported solely by said lower portion, means for securing said lower portion in operative relationship with said heater, a projection formed on said lower portion, a spring mounted in compression between said projection and said upper portion for biasing said shield to extended condition wherein one end of said upper portion projects above the top surface of said heater, a temperature sensing element in said one end of said upper portion and containing an expansible fluid, a capillary tube extending from said member and having a portion thereof coiled within said lower portion and supported on said supporting means for biasing said sensing element toward said one of said shield, a projection formed on said upper shield portion for limiting movement of said sensing element under the bias of said capillary tube, and abutment means associated with said upper and lower shield portions for limiting relative movement thereof toward extended condition.

References Cited in the file of this patent

UNITED STATES PATENTS

| | | |
|---|---|---|
| 2,032,563 | Clifford et al. | Mar. 3, 1936 |
| 2,303,012 | Weber et al. | Nov. 24, 1942 |
| 2,399,423 | Bletz | Apr. 30, 1946 |
| 2,471,240 | Rider | May 24, 1949 |
| 2,534,097 | Akeley | Dec. 12, 1950 |
| 2,699,487 | Turner | Jan. 11, 1955 |